(12) United States Patent
Gilmore

(10) Patent No.: US 10,274,124 B2
(45) Date of Patent: Apr. 30, 2019

(54) FRAMEWORK ASSEMBLY AND HYDRAULIC SYSTEM HAVING THE SAME

(71) Applicant: Robert Bosch GmbH, Stuttgart (DE)

(72) Inventor: Ben Gilmore, Lowbanks (CA)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 14/858,969

(22) Filed: Sep. 18, 2015

(65) Prior Publication Data
US 2016/0084286 A1 Mar. 24, 2016

Related U.S. Application Data

(60) Provisional application No. 62/052,796, filed on Sep. 19, 2014.

(51) Int. Cl.
*F16M 1/08* (2006.01)
*F15B 15/18* (2006.01)

(52) U.S. Cl.
CPC ............... *F16M 1/08* (2013.01); *F15B 15/18* (2013.01)

(58) Field of Classification Search
CPC ... A47B 31/0314; A47B 57/00; A47B 47/027; A47B 96/00; F16M 2200/08; G06F 1/1613; H05K 5/00; E02D 27/01; Y10T 403/4685; Y10T 403/4694; Y10T 403/4668; Y10T 403/4665; F16B 2200/20
USPC ....... 248/346.03, 346.07, 670, 678; 211/191, 211/192; 312/265.1, 265.2, 265.3, 265.4
See application file for complete search history.

(56) References Cited

U.S. PATENT DOCUMENTS

| | | | | |
|---|---|---|---|---|
| 906,796 A | * | 12/1908 | Hawk | E01B 11/26 238/235 |
| 1,080,124 A | * | 12/1913 | Reed | E01B 11/26 238/235 |
| 1,398,695 A | * | 11/1921 | Hull | E04B 2/14 52/286 |
| 1,417,531 A | * | 5/1922 | Kirkwood | E01B 11/26 238/233 |
| 1,530,706 A | * | 3/1925 | Vandivier | E01B 11/26 238/235 |
| 1,563,563 A | * | 12/1925 | Gerdes | B61L 5/026 246/452 |

(Continued)

FOREIGN PATENT DOCUMENTS

| | | | | |
|---|---|---|---|---|
| DE | 3710624 C1 | * | 10/1988 | ........... E04B 1/6137 |
| EP | 0142659 A2 | * | 5/1985 | ............. A47B 47/04 |
| EP | 0421975 A1 | * | 4/1991 | ............. F24D 19/06 |

*Primary Examiner* — Kimberly T Wood
(74) *Attorney, Agent, or Firm* — Michael Best & Friedrich LLP

(57) ABSTRACT

A framework assembly comprises a tank rail containing a plurality of tank mounting apertures over a tank rail length and a pump-motor-group (PMG) support rail, arranged generally perpendicular to and mounted to the tank rail, and including a plurality of tank rail mounting apertures along a PMG support rail length. One of the tank rail or the PMG support rail includes a protuberance and the other of the tank rail and the PMG support rail includes a dimple sized and shaped to receive the protuberance. The tank rail and the PMG support rail attach to one another via the tank mounting apertures and the tank rail mounting apertures at any one of a plurality of optional points along the tank rail length.

19 Claims, 12 Drawing Sheets

(56) References Cited

U.S. PATENT DOCUMENTS

| | | | | |
|---|---|---|---|---|
| 1,850,118 | A * | 3/1932 | Meyers | E04B 1/24 52/223.6 |
| 2,611,460 | A * | 9/1952 | Nash | A47B 47/025 211/135 |
| 2,632,938 | A * | 3/1953 | Kopf | D03D 9/00 28/152 |
| 2,935,210 | A * | 5/1960 | Cohen | A47B 87/002 108/106 |
| 3,237,779 | A * | 3/1966 | Eger | A47B 57/30 211/191 |
| 3,305,255 | A * | 2/1967 | Henderson | F16B 12/50 403/219 |
| 3,468,430 | A * | 9/1969 | Lawman | A47F 5/14 211/182 |
| 3,784,273 | A * | 1/1974 | Nikolai | A47B 47/0075 16/382 |
| 3,938,900 | A * | 2/1976 | Apple, Sr. | F16B 7/0446 403/263 |
| 3,963,290 | A * | 6/1976 | Rennemann | B65D 88/14 211/191 |
| 4,040,694 | A * | 8/1977 | Lascarrou | A47B 47/03 312/263 |
| 4,064,996 | A * | 12/1977 | Shillum | A47B 57/402 108/107 |
| 4,261,470 | A * | 4/1981 | Dolan | F16B 12/36 108/55.1 |
| 4,347,015 | A * | 8/1982 | Olashaw | F16B 12/50 403/171 |
| 4,545,490 | A * | 10/1985 | Hsiao | F16B 12/30 211/182 |
| 4,972,783 | A * | 11/1990 | Crissman | A47B 57/485 108/107 |
| 5,011,031 | A * | 4/1991 | Konstant | A47B 47/027 211/191 |
| 5,180,068 | A * | 1/1993 | Vargo | F16B 12/10 211/191 |
| 5,188,479 | A * | 2/1993 | Nehls | E04B 1/2403 403/300 |
| 5,458,428 | A * | 10/1995 | West | A47G 29/1216 403/252 |
| 5,542,549 | A * | 8/1996 | Siemon | H04Q 1/06 211/189 |
| 5,713,651 | A * | 2/1998 | Essig | F16B 12/50 312/265.4 |
| 5,735,411 | A * | 4/1998 | Flamme | H02B 1/30 108/180 |
| 5,806,820 | A * | 9/1998 | Simon | F16L 3/24 211/192 |
| 5,961,243 | A * | 10/1999 | Michaluk, III | A47B 47/00 211/182 |
| 6,238,028 | B1 * | 5/2001 | Benner | H02B 1/32 211/192 |
| 6,240,687 | B1 * | 6/2001 | Chong | A47B 13/06 220/668 |
| 7,850,390 | B2 * | 12/2010 | Lisbona | B01D 46/0004 220/668 |
| 7,975,860 | B2 * | 7/2011 | Dittus | H05K 7/1489 211/192 |
| 8,042,777 | B2 * | 10/2011 | Ruiz | H02G 3/086 211/103 |
| 8,695,815 | B2 * | 4/2014 | Takahashi | H05K 7/1432 211/182 |
| 2007/0062898 | A1 * | 3/2007 | Choi | A47B 57/408 211/192 |
| 2009/0078665 | A1 * | 3/2009 | Sandusky | B62B 3/005 211/208 |

* cited by examiner

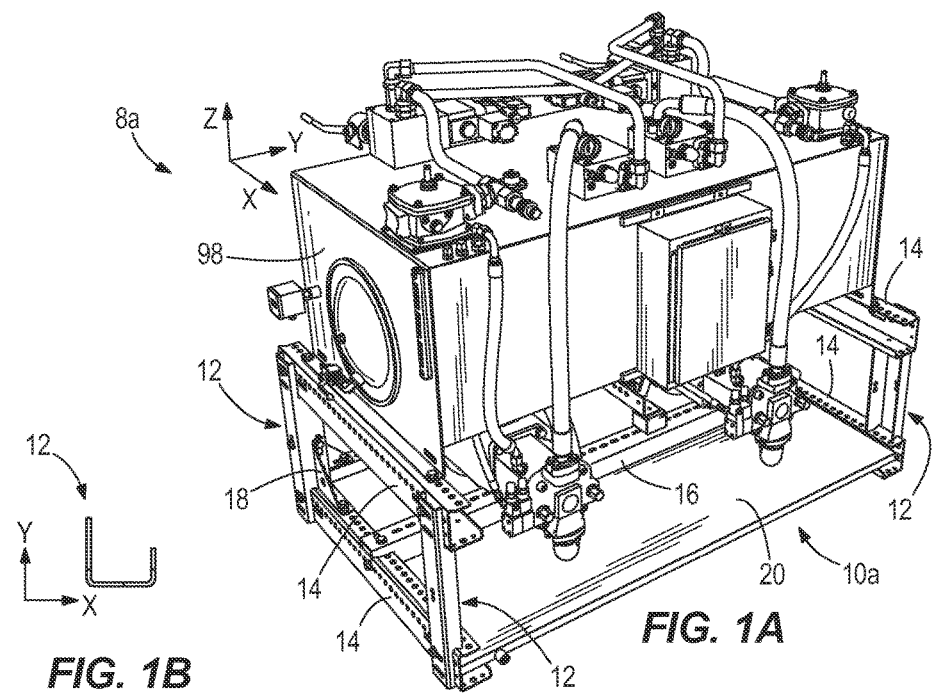
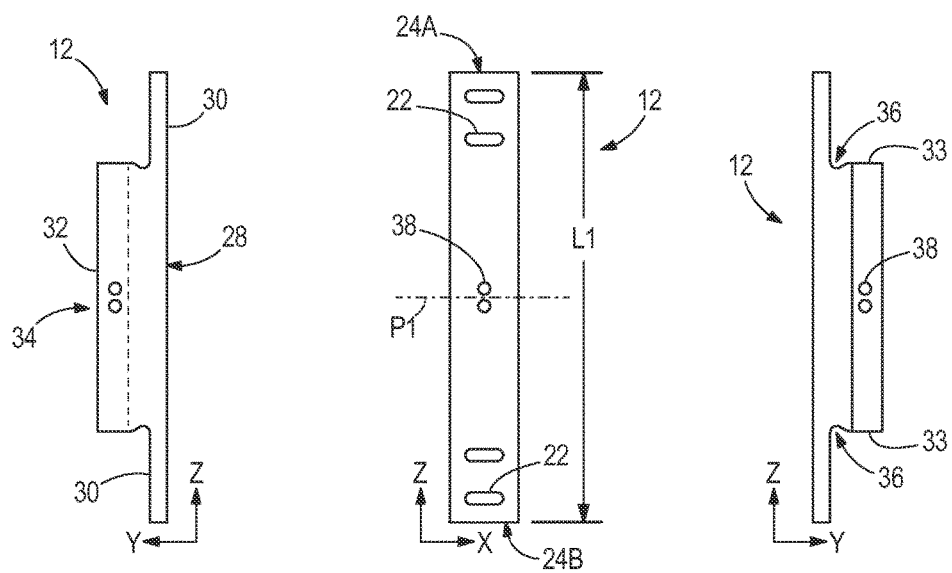
FIG. 1A
FIG. 1B
FIG. 1C
FIG. 1D
FIG. 1E

FRAMEWORK ASSEMBLY AND HYDRAULIC SYSTEM HAVING THE SAME

BACKGROUND OF THE INVENTION

Traditionally support framework on hydraulic systems consists of a welded structure. The manufacturing and assembly of such structures is expensive and time consuming. Additionally, a welded structure is only as good as the weld and welder doing the work, has an increased delivery time, and is rigid in that it does not allow for reconfiguration or reuse when upgraded with new or additional elements that mount to them (e.g., tanks, pump-motor-groups, accumulators, filters, coolers). A pump-motor-group, or PMG, may serve as a hydraulic power unit and includes an electric motor which drives a pump to provide hydraulic pressure in various applications (i.e., industrial applications such as hydraulic presses, service industries such as hydraulic-operated car washes, etc.).

SUMMARY OF THE INVENTION

In one aspect, the invention provides a framework assembly comprises a tank rail containing a plurality of tank mounting apertures over a tank rail length and a pump-motor-group (PMG) support rail, arranged generally perpendicular to and mounted to the tank rail, and including a plurality of tank rail mounting apertures along a PMG support rail length. One of the tank rail or the PMG support rail includes a protuberance and the other of the tank rail and the PMG support rail includes a dimple sized and shaped to receive the protuberance. The tank rail and the PMG support rail attach to one another via the tank mounting apertures and the tank rail mounting apertures at any one of a plurality of optional points along the tank rail length.

BRIEF DESCRIPTION OF THE DRAWINGS

FIG. 1A is a perspective view of a hydraulic system including a framework assembly.

FIG. 1B is a top view of a vertical rail of the framework assembly.

FIG. 1C is a left side view of the vertical rail of the framework assembly.

FIG. 1D is a front view of the vertical rail of the framework assembly.

FIG. 1E is a right side view of the vertical rail of the framework assembly.

FIG. 2C is a front view of the tank rail of the framework assembly.

FIG. 2E is a right side view of the tank rail of the framework assembly.

FIG. 3C is a front view of the PMG rail of the framework assembly.

FIG. 3E is a right side view of the PMG rail of the framework assembly.

Figure 2A:
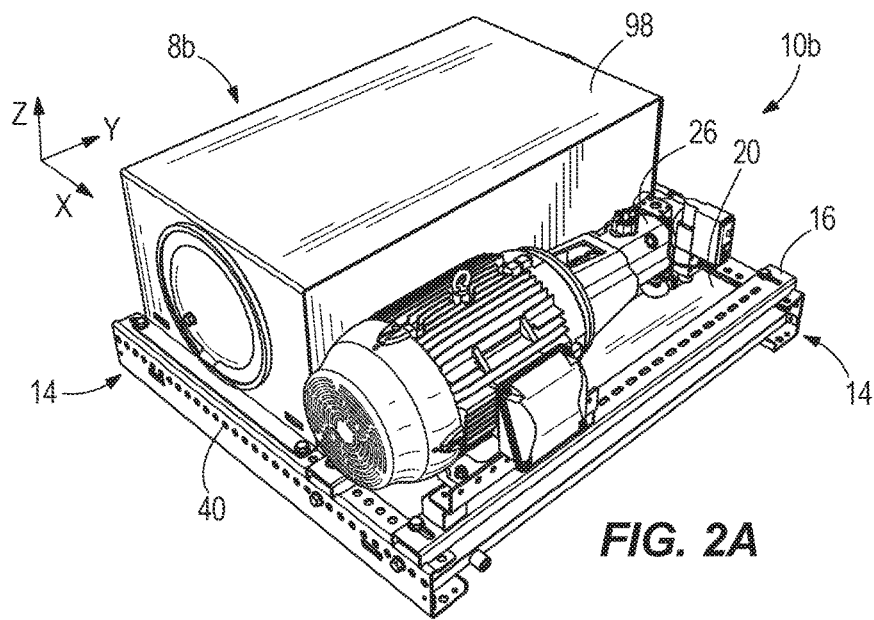
FIG. 2A is a perspective view of a hydraulic system including a framework assembly in an alternative configuration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

As shown in FIG. 1A, a hydraulic system 8a includes five different pieces that, when bolted together, form a framework 10a. Each of the five pieces can be used more than once in a single framework 8a. The framework pieces include a tank rail 14, a PMG support rail 16, a vertical rail 12, a gusset 18, and a driptray 20. The vertical, tank, and PMG support rails 12, 14, 16 may be manufactured in a variety of lengths L1, L2, L3, to meet a variety of application needs. The gusset 18 is a standardized piece that fits any length of the aforementioned rails 14, 16, 12. The driptray 20 may be manufactured in a variety of lengths L5 and widths W5, dependent on the size of the tank and PMG support rails 14, 16 used. Each of these components is further described in greater detail with respect to FIGS. 1A-5E.

FIGS. 1A-1E depict the vertical rail 12 of the framework assembly 10a for the hydraulic system 8a. The vertical rail 12, as with all rails of a framework assembly 10a-10h, is made of steel and can be powder-coated. When the framework assembly 10a is in an assembled state, the length L1 of the vertical rail 12 extends in a vertical orientation as shown in FIG. 1D and designated as the direction Z. The vertical rail 12 can be, as shown, symmetrical about a central plane P1 perpendicular to the length L1 of the vertical rail 12. The vertical rails 12 contain a plurality of mounting channels 22 located adjacent the top 24A and bottom 24B of the rail 12 (i.e. adjacent the opposing lengthwise ends 24A, 24B of the vertical rail 12). The vertical mounting channels 22 correspond to various mounting apertures 40 found within a tank rail 14 and are shown on the front surface 28 of FIG. 1D. While one component may contain channels, and the other may contain apertures, it is contemplated that the channel or aperture feature may be switched between the two components in other embodiments. While the term channel is typically understood to refer to an elongated aperture, the term aperture is understood to apply to both elongated apertures, or "channels", and non-elongated apertures throughout the disclosure.

When viewing the vertical rail 12 from the top 24A (i.e. XY plane) as shown in FIG. 1B, the vertical rail 12 is formed as a U-shape or an uneven U-shape depending on the location along the length L1 at which the cross-section is viewed. This corresponds with a plurality of even leg sections 30 at the top and bottom of the vertical rail 12 and an uneven body section 32 in the middle 34 (FIGS. 1C, 1E). The uneven body section 32 includes a support portion which extends beyond the cross-section of the even leg sections 30 and allows the vertical rail 12 to provide structural support when mated with the tank rail 14 as discussed below. At the transitions from the leg sections 30 to the body section 32, a dimple 36 can be provided for easy alignment and secure mounting. A plurality of apertures 38 can be provided throughout the middle 34 of the vertical rail 12 on any side. The apertures 38 can be used for mounting to a gusset 18. The vertical rail 12 can be provided in different lengths (e.g., ranging from 12 inches to 48 inches).

Figure 2B:
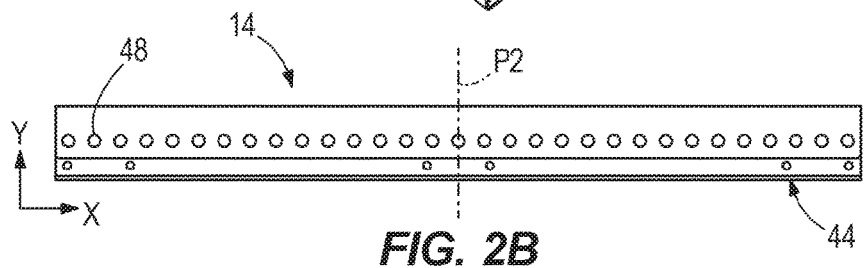
FIG. 2B is a top view of a tank rail of the framework assembly.
Figure 2D:
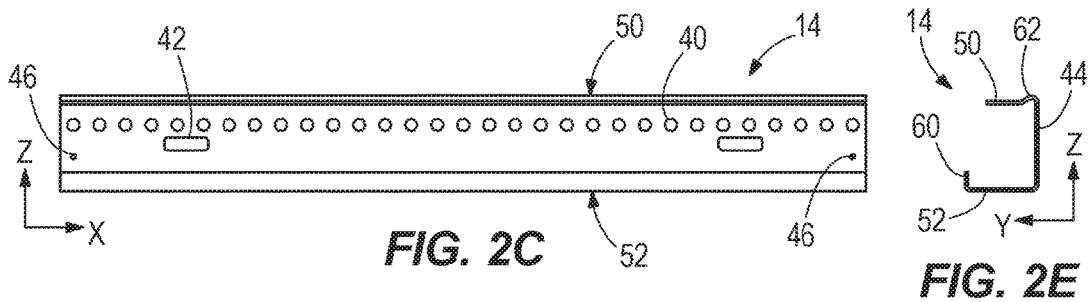
FIG. 2D is a bottom view of the tank rail of the framework assembly.
Figure 2D:
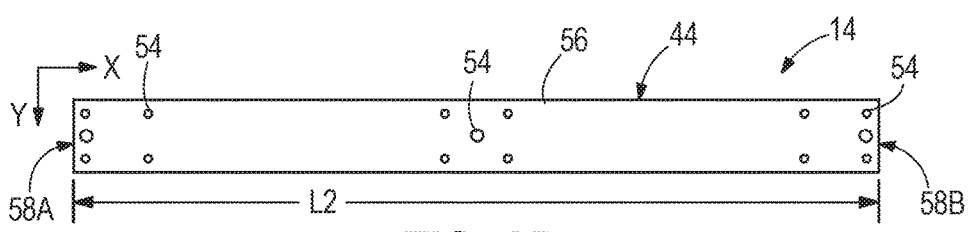
Figure 3A:
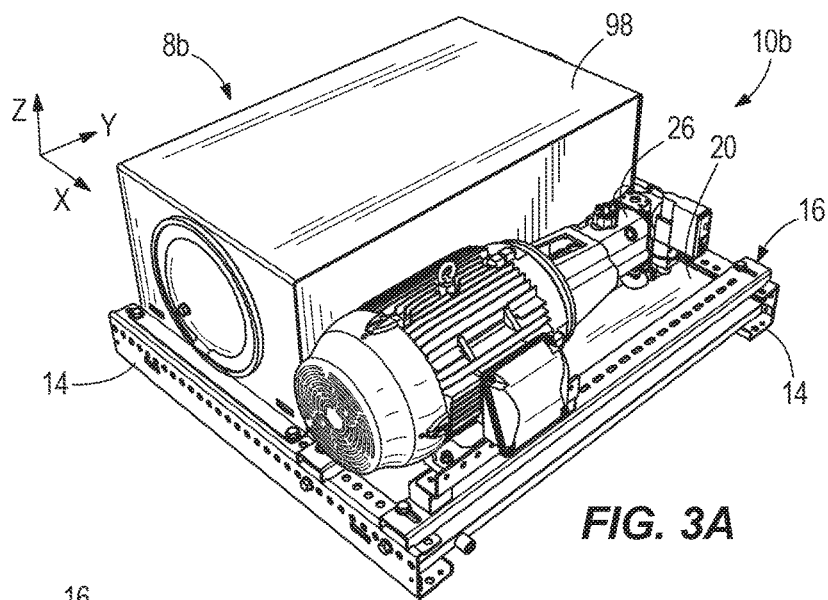
FIG. 3A is a perspective view of the hydraulic system including the framework assembly in the configuration shown in FIG. 2A.
Figure 3B:
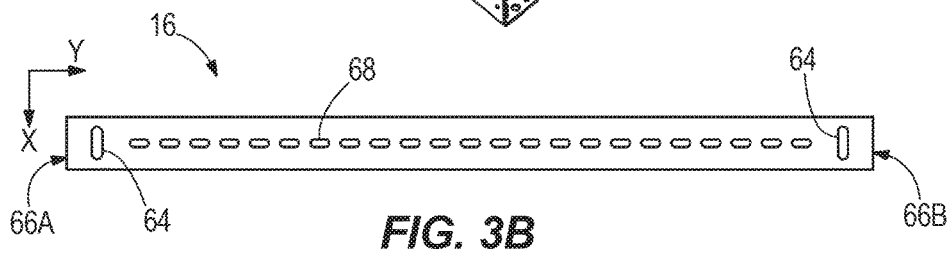
FIG. 3B is a top view of a PMG rail of the framework assembly.
Figure 3D:
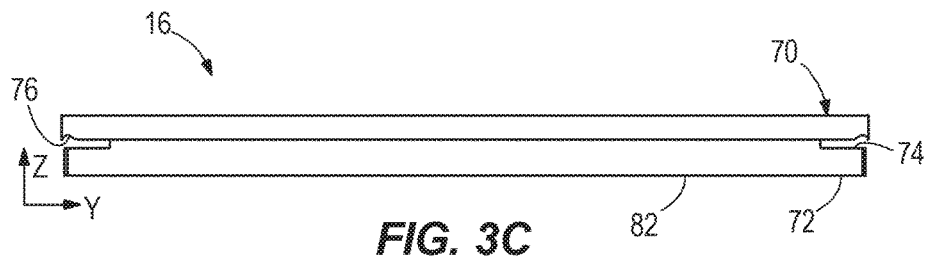
FIG. 3D is a bottom view of the PMG rail of the framework assembly.
Figure 3D:
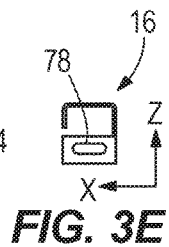
Figure 3D:
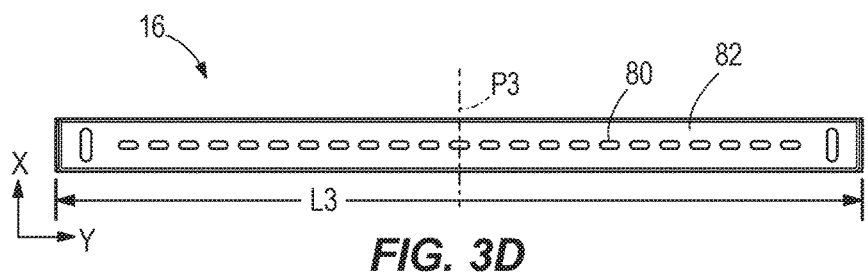
Figure 4A:
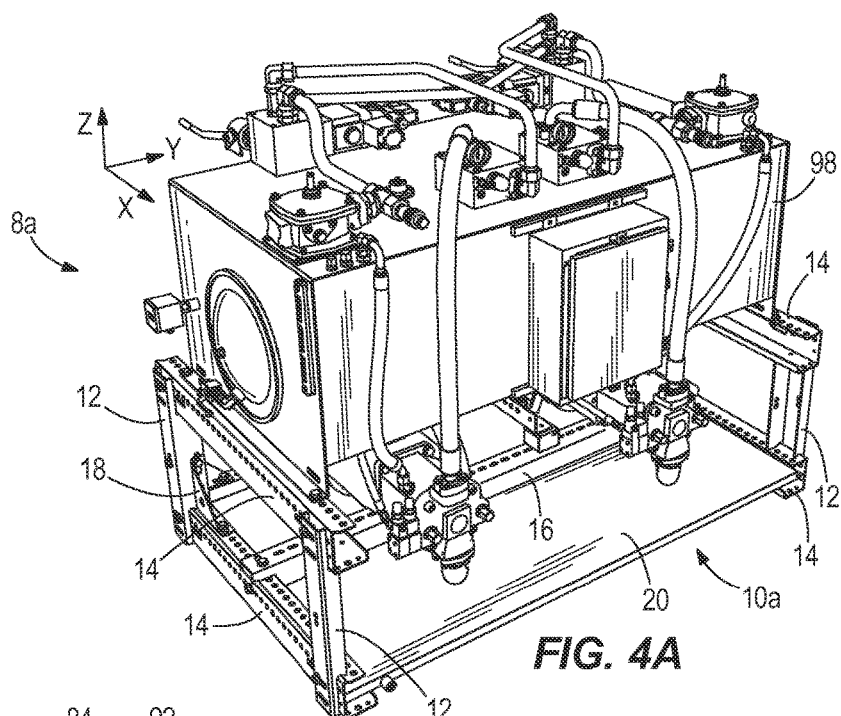
FIG. 4A is a perspective view of the hydraulic system including the framework assembly in the configuration shown in FIG. 1A.
Figure 4B:
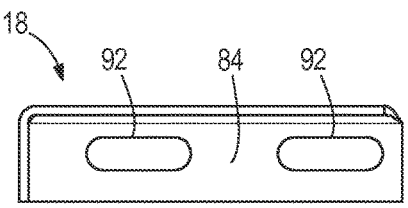
FIG. 4B is a top view of a gusset of the framework assembly.
Figure 4C:
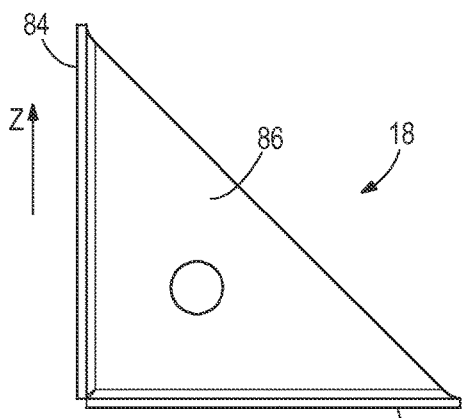
FIG. 4C is a front view of the gusset of the framework assembly.
Figure 4D:
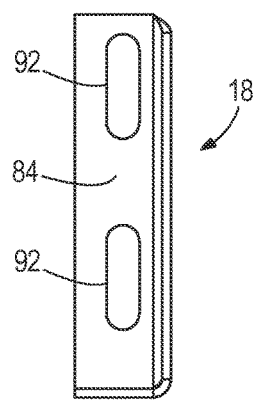
FIG. 4D is a right side view of the gusset of the framework assembly.
Figure 5A:
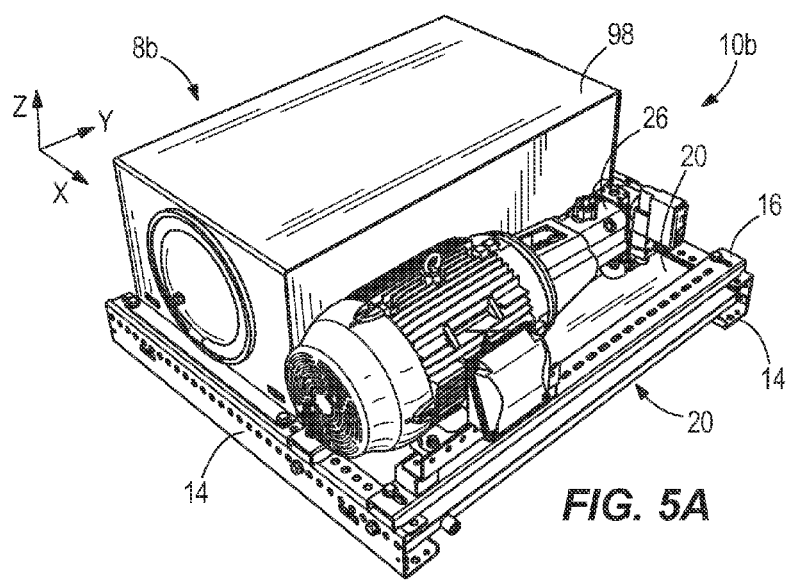
FIG. 5A is a perspective view of the hydraulic system including the framework assembly in the configuration shown in FIG. 2A.
Figure 5B:
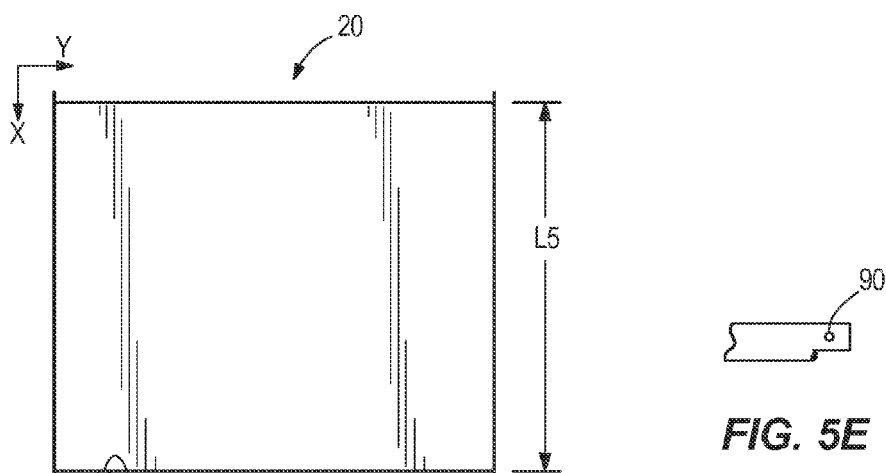
FIG. 5B is a top view of a driptray of the framework assembly.
Figure 5E:
FIG. 5E is an enlarged view of an alignment or mating feature of the driptray.
Figure 5C:
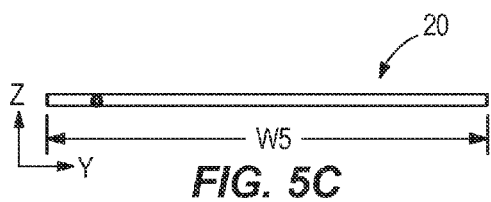
FIG. 5C is a front view of the driptray of the framework assembly.
Figure 5D:
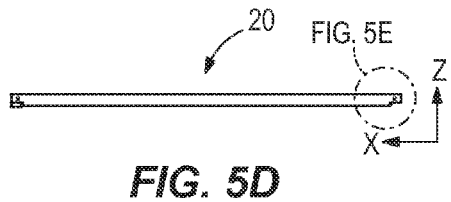
FIG. 5D is a right side view of the driptray of the framework assembly.

FIGS. 2A-2E depict the tank rail 14 for the framework assembly 10b for a hydraulic system 8b. The tank rail 14 is positioned generally perpendicular to the vertical rail 12 and mates with a plurality of vertical rails 12 if increased height is desired. The tank rail 14 can be symmetrical about a central plane P2 perpendicular to a length L2 of the tank rail 14. The tank rail 14 includes a top surface 50, the top surface supporting a tank 98. A plurality of mounting apertures 40 and mounting channels 42 are provided along a front surface 44 (FIG. 2C) of the tank rail 14, perpendicular to the top surface. The mounting apertures 40 and mounting channels 42 mate with the vertical mounting channels 22 of the vertical rail 12 to enable multiple possible mounting configurations depending on the length of the tank rail 14 and the location at which the vertical rail 12 is mounted along the tank rail 14. Any mounting location within the framework assembly 10b is fixed via bolts 100 (FIGS. 12A-12B) and locking nuts (e.g., nylon locking nuts, or "ny-lock" nuts) to prevent the bolted connection from loosening; however, any functional alternative (e.g., other fasteners) may be used. Additionally, along the front surface 44, a plurality of smaller driptray mounting apertures 46 are provided below the mounting apertures 40 for the vertical rails 12. A plurality of evenly-spaced tank mounting apertures 48 are provided on a top surface 50 of the tank rail 14 (FIG. 2B). The top surface 50 of the tank rail 14 supports components of the hydraulic system 10b, in particular a tank 98, and is located vertically above the bottom surface 52 shown in FIG. 2D. A top surface of any rail is defined as a surface in the XY plane and located vertically above a bottom surface. The tank mounting apertures 48 allow a tank 98 to be mounted at various points along the tank rail 14 and also provides points for mounting a gusset 18 or a pump-motor-group support rail 16 (i.e., PMG support rail 16), described in more detail below. A plurality of ground mounting apertures 54 are provided on the bottom surface 52 at the center 56 and adjacent the opposing lengthwise ends 58A, 58B of the tank rail 14 (FIG. 2D). The ground mounting apertures 54 allow the entire framework assembly 10b to be rigidly mounted to the ground, a caster wheel or an alternative base structure.

As shown in FIG. 2E, viewing the tank rail 14 from an end 58B (i.e. YZ plane), the tank rail 14 consists of four sides, with a short vertical inside 60 connected to the horizontal (Y-direction) bottom surface 52, connected to the vertical front surface 44, and connected to the generally horizontal (Y-direction) top surface 50 of the tank rail 14. The top surface 50 of the tank rail 14 contains a protuberance 62 extending outward near the junction of the top surface 50 and the front surface 44. The protuberance 62 may serve to direct any leakage above the rail 14 into a driptray 20. The tank rail 14 can be provided in various lengths (e.g. ranging from 18 inches to 108 inches).

FIGS. 3A-3E depict the PMG support rail 16 of the framework assembly 10b for the hydraulic system 8b. The PMG support rail 16 is assembled generally perpendicular to the vertical rail 12 and the tank rail 14 and mates with the tank rail 14. The PMG support rail 16 can be symmetrical about a central plane P3 perpendicular to a length L3 of the PMG support rail 16. A tank rail mounting aperture or channel 64 is located adjacent each of the opposing lengthwise ends 66A, 66B of the PMG support rail 16 (FIG. 3B) (e.g., the aperture 64 is within three inches of the ends 66A, 66B, the aperture 64 is within a width or depth of the tank rail 14 of the ends 66A, 66B, the width and depth each perpendicular to the length of the tank rail 14, etc.) the aperture 64 is within. This channel 64 mates with any of a plurality of optional points via the tank mounting apertures 48 of the tank rail 14 and is moveable along any point of the length L2 of the tank rail 14. A plurality of PMG mounting channels 68 are provided along the length L3 of the PMG support rail 16. The PMG mounting channels 68 allow a pump-motor-group 26 (i.e., PMG 26) to be mounted to the framework assembly 10b.

As viewed from the front (FIG. 3C) and side (i.e. cross section; FIG. 3E), the PMG support rail 16 includes an upper portion 70 and a lower portion 72 separated at each opposing lengthwise end 66A, 66B by a slit 74. Each slit 74 allows the upper portion 70 of the PMG support rail 16 to be placed above the top surface 50 of the tank rail 14 while the lower portion 72 is provided between the top and bottom surfaces 50, 52 of the tank rail 14. As seen in FIG. 3C, the slit 74 also contains a dimple 76 that is generally complementary to (i.e. the same size and shape as) the protuberance 62 of the tank rail 14 such that the dimple 76 receives the protuberance 62. The mating of the dimple 76 and the protuberance 62 provides assurance of correct alignment. An end channel 78 and a plurality of base channels 80 can also be provided on the ends 66A, 66B (i.e. cross-section; FIG. 3E) and a bottom surface 82 (FIG. 3D), respectively, as additional mounting points. The length L3 of the PMG support rail 16 is dependent upon a tank size (e.g. 5-10 gal., 60 gal., 200 gal.) and in some constructions ranges from approximately 27 inches to approximately 78 inches.

FIGS. 4A-4D depict the gusset 18 of the framework assembly 10a for the hydraulic system 8a. The gusset 18 is a right triangle. In some constructions, the gusset 18 is approximately eight inches tall and eight inches in length. Flat plates 84 extend perpendicular to the triangular plate 86 along the vertical (i.e. Z-direction) and horizontal (i.e. perpendicular to the Z-direction) edges. The flat plates 84 contain a plurality of gusset mounting channels 92 that mate with various apertures and channels 48, 38 of the tank rail 14 and the vertical rail 12. As shown, the gusset 18 can be located at a position where a tank rail 14 and a vertical rail 12 meet, and provides additional structural support for the framework assembly 10a. Despite the various usable lengths of both the tank rail 14 and the vertical rail 12, the gusset 18 may be provided in a single size that mounts to any combination of rail sizes.

FIGS. 5A-5D depict the driptray 20 of the framework assembly 10b for the hydraulic system 8b. The driptray 20 may be formed as a large flat pan. While the driptray 20 may not be provided in some embodiments, it can be used to catch any escaped fluids. The driptray 20 can contain a drain opening 94 at one end which can be attached to a tube 96 to prevent overflowing of the driptray 20. The driptray 20 slides between the top 50 and bottom surfaces 52 of the tank rail 14 and includes apertures 90 for mounting to the driptray mounting apertures 46. Each of a length L5 and a width W5 of the driptray 20 is dependent upon the particular length of the framework assembly 10b and the width and fluid capacity of the tank 98 to be used. For example, for five to ten gallon tanks 98, the width W5 of the driptray 20 can be about 27 inches, and the length L5 of the driptray 20 can vary from 18 inches to 108 inches. The framework assembly 10b can be designed to accommodate a variety of tank sizes (e.g., ranging from five gallons to two hundred gallons).

The invention provides standardized support pieces that when bolted together can form an infinite number of framework arrangements for use in flooded suction or positive suction hydraulic systems. This allows for a standardized, repetitive, cost effective, and quick delivery approach. All components can be removably coupled to form the framework 10a-10h without welding or other permanent attachments that require destructive means to separate.

Figure 6A:
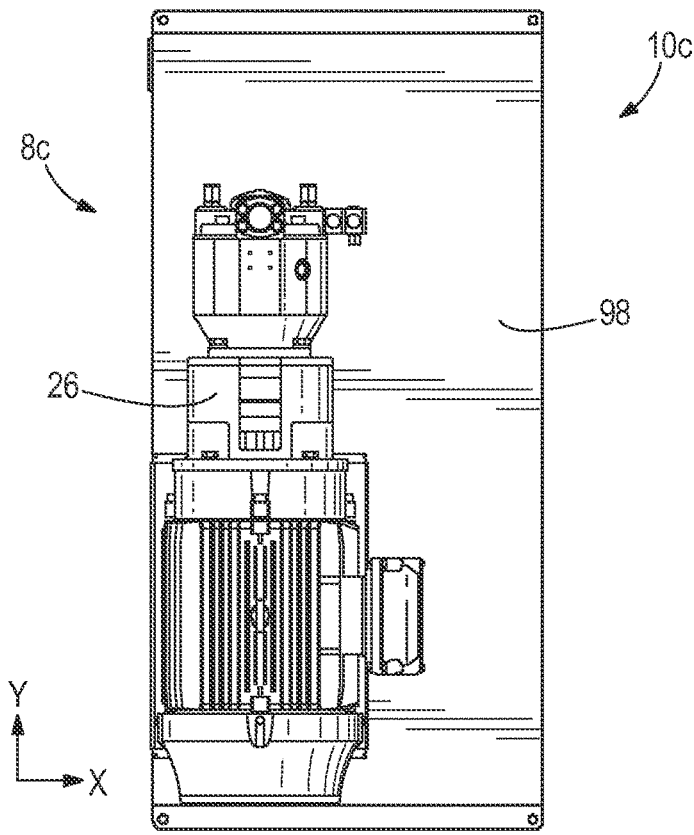
FIG. 6A is a top view of a hydraulic system including a framework assembly in another alternative configuration.
Figure 6B:
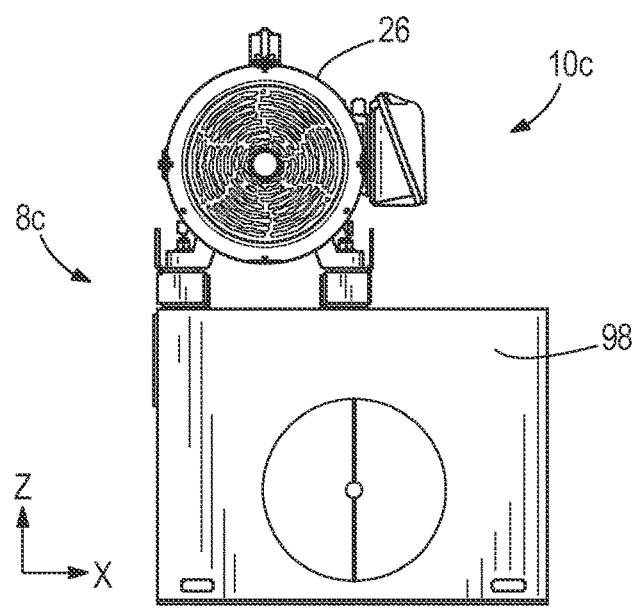
FIG. 6B is a front view of the hydraulic system of FIG. 6A.

FIGS. 6A-12B depict various embodiments of a framework assembly 10b-h for various layouts of hydraulic systems 8b-8h, respectively. Each embodiment contains a top view (A) and a front view (B). FIGS. 6A and 6B show an assembly which, in addition to the PMG 26 and the tank 98, includes only a plurality of PMG support rails 16 for mounting the PMG 26 to the top of the tank 98. While the assembly 10c utilizes a component (i.e., PMG support rails 16) described above to create the assembly 10c, the layout does not take advantage of many of the securement features of other assemblies 10a, 10b, 10d-h, all of which mate a PMG support rail 16 to a tank rail 14.

Figure 7A:
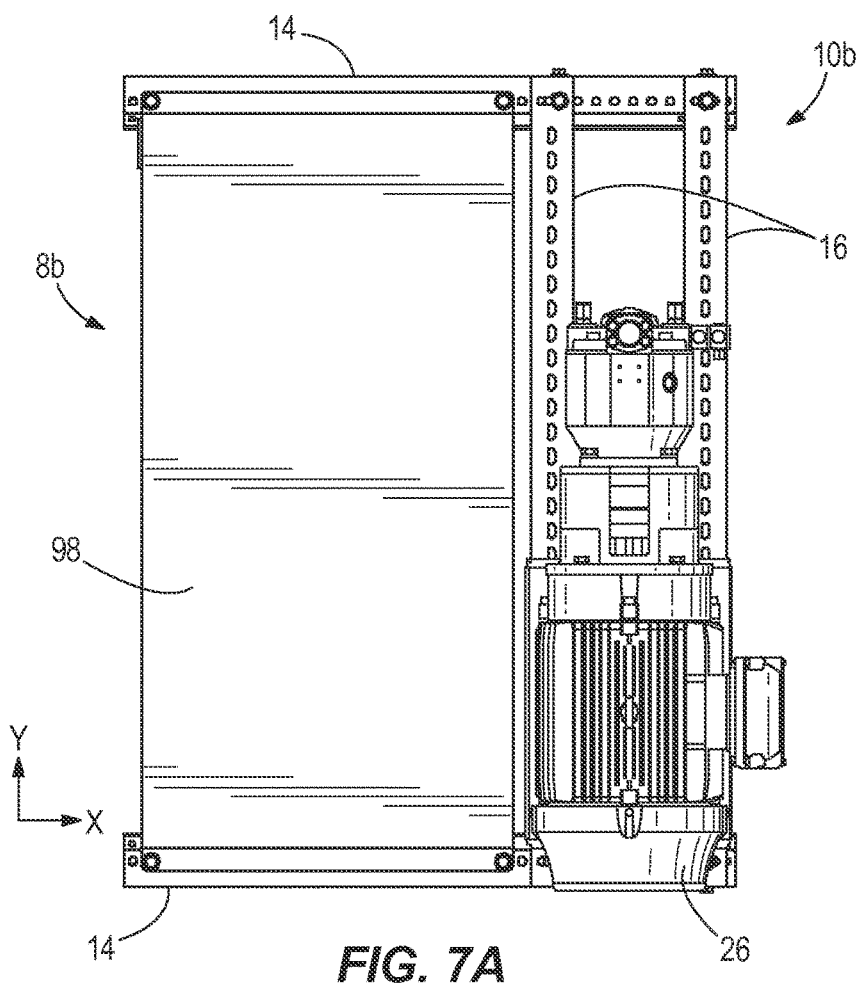
FIG. 7A is a top view of a hydraulic system including a framework assembly in the configuration shown in FIG. 2A.
Figure 7B:
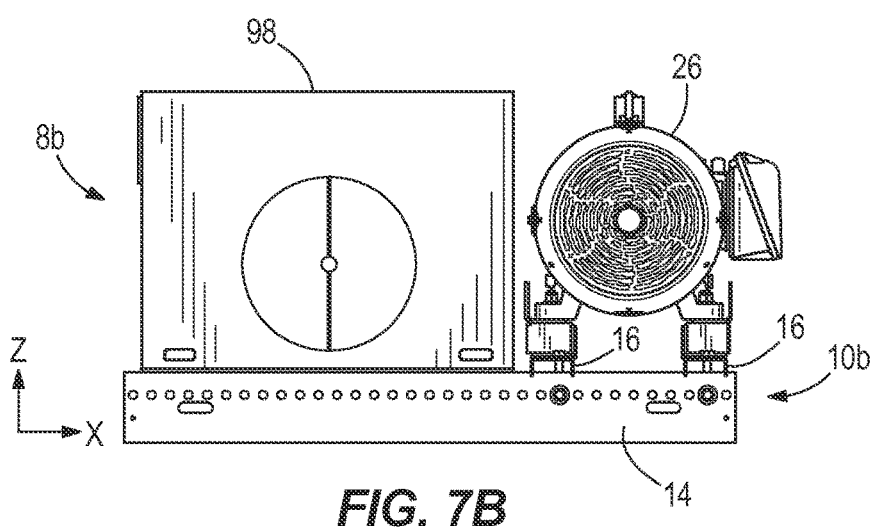
FIG. 7B is a front view of the hydraulic system of FIG. 7A.

The assembly 10b of FIGS. 7A and 7B utilizes a plurality of tank rails 14 for mounting both a tank 98 and a plurality of PMG support rails 16. A PMG 26 is mounted to the PMG support rails 16. Each PMG support rail 16 mates with the tank rails 14, and is held in place via multiple securement features. Two bolts 100 are used to secure each PMG support rail 16 to each tank rail 14, one bolt 100 threaded perpendicular to the other bolt 100 (i.e., the mounting apertures 40 mating with the end channels 78 and the tank mounting apertures 48 mating with the tank rail mounting apertures 64). The use of two bolts 100, angled (e.g., at ninety degrees) relative to one another prevents or limits potential bending and torsion stresses in the assembly 10b, and provides additional stiffness to the assembly 10b. Additionally, as the top surface 50 of the tank rail 14 slides within the slit 74 of each PMG support rail 16, the protuberance 62 aligns with and is received by the dimple 76, providing further security. Although, as shown, the tank rail 14 includes the protuberance 62 and the PMG support rail 16 includes the dimple 76, it is well within the scope of the invention to locate the protuberance 62 on the PMG support rail 16 and locate the dimple 76 on the tank rail 14. With varying layouts, assemblies 10a and 10d-10h take advantage of the same securement features as those shown in assembly 10b and described above.

Figure 8A:
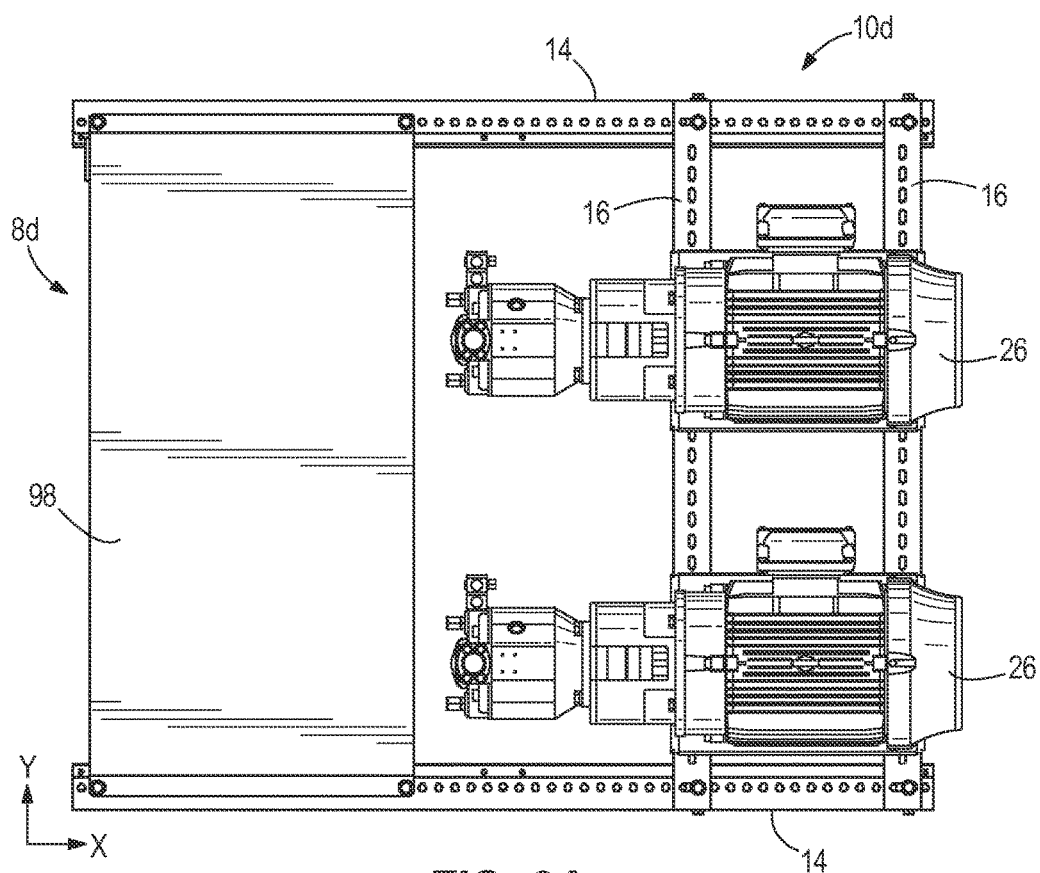
FIG. 8A is a top view of a hydraulic system including a framework assembly in yet another alternative configuration.
Figure 8B:
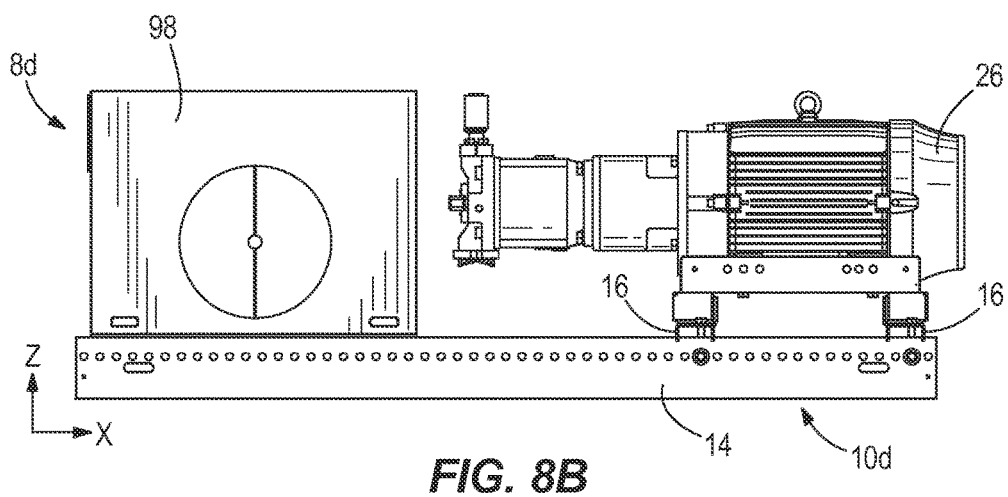
FIG. 8B is a front view of the hydraulic system of FIG. 8A.
Figure 9A:
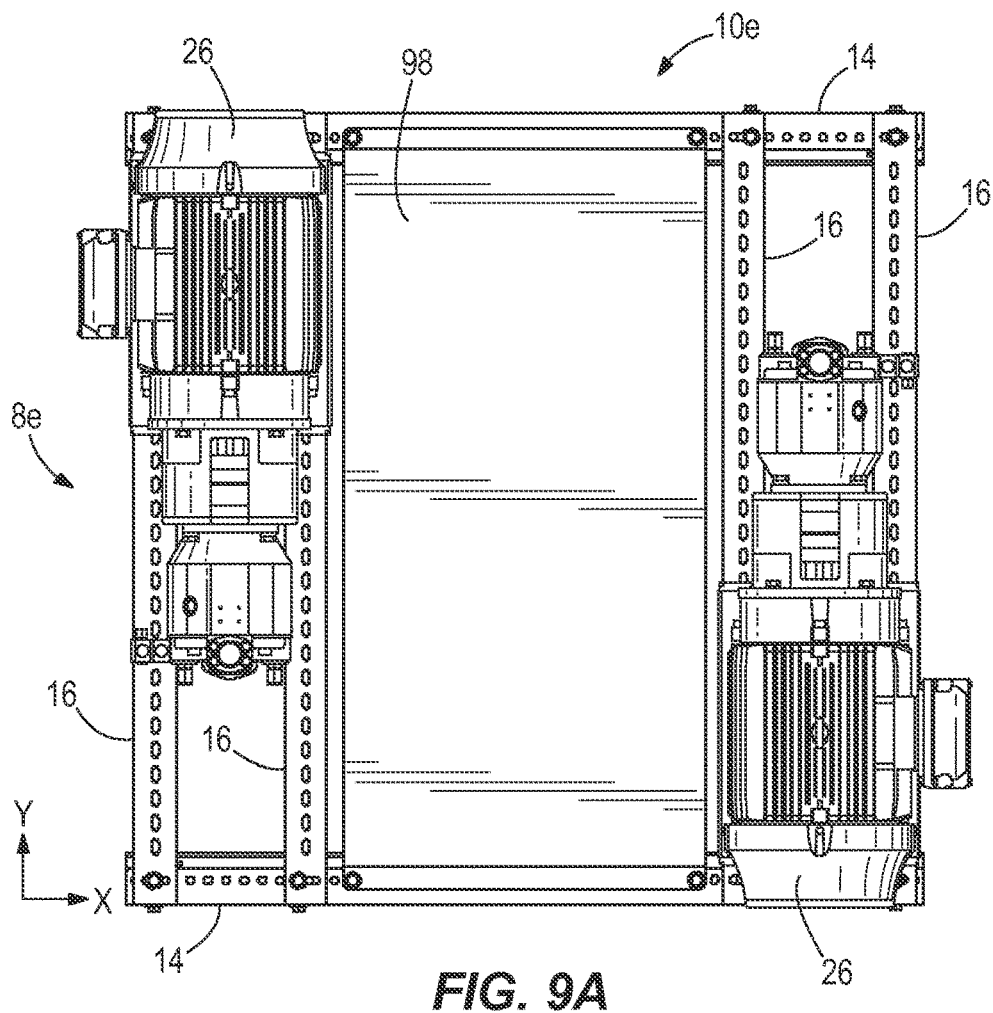
FIG. 9A is a top view of a hydraulic system including a framework assembly in yet another alternative configuration.
Figure 9B:
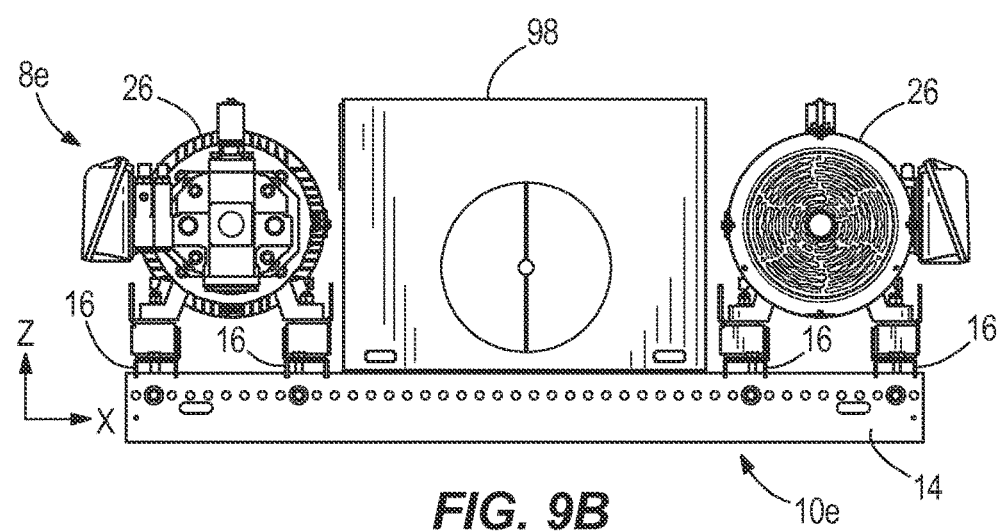
FIG. 9B is a front view of the hydraulic system of FIG. 9A.
Figure 10A:
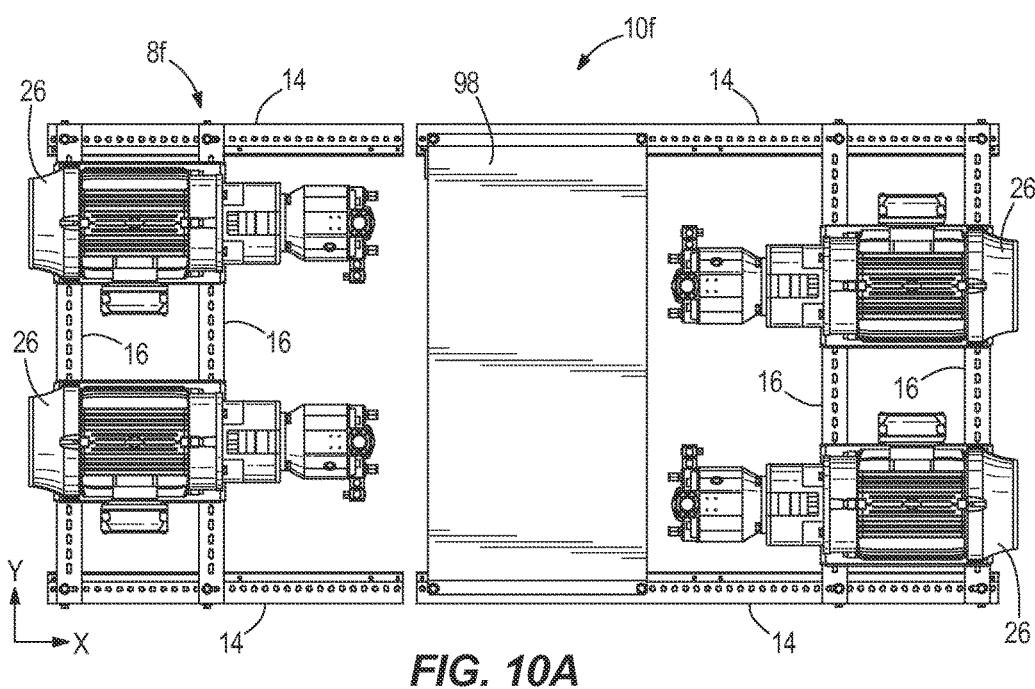
FIG. 10A is a top view of a hydraulic system including a framework assembly in yet another alternative configuration.
Figure 10B:
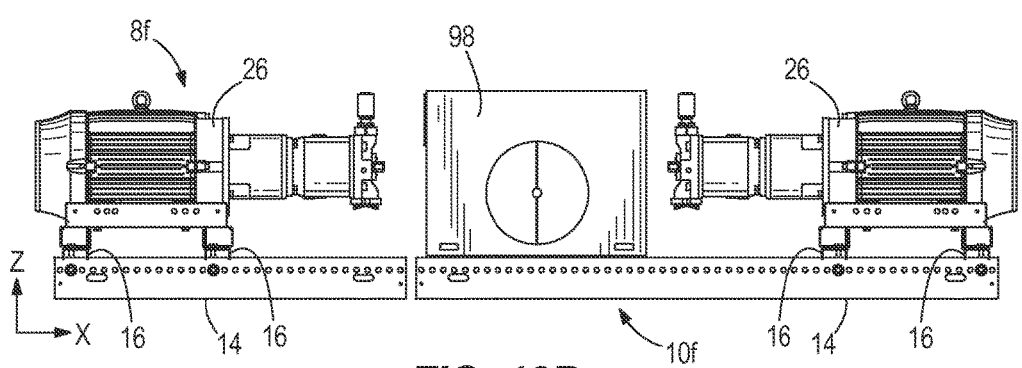
FIG. 10B is a front view of the hydraulic system of FIG. 10A.
Figure 11A:
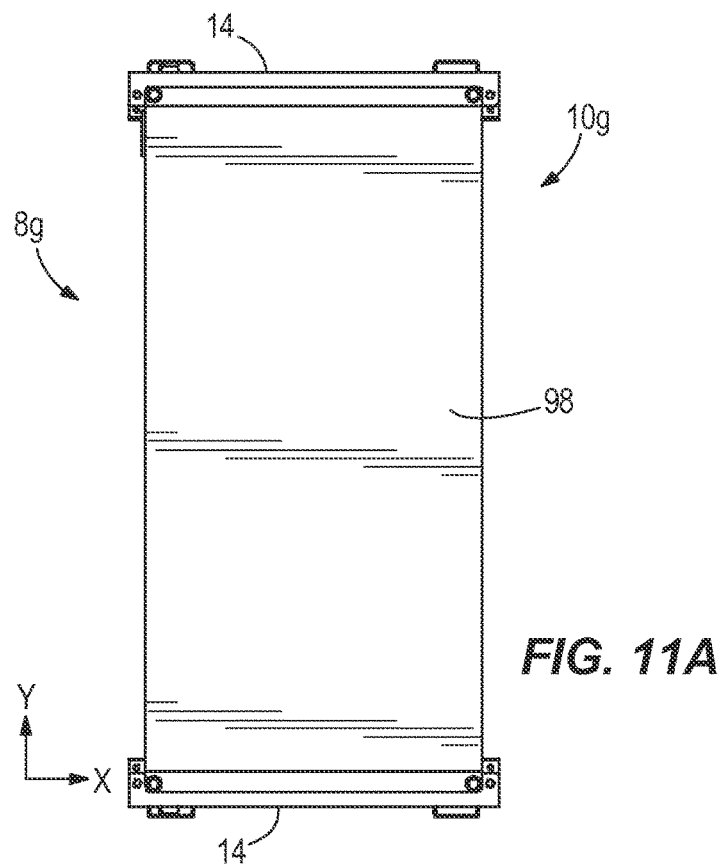
FIG. 11A is a top view of a hydraulic system including a framework assembly in another alternative configuration.
Figure 11B:
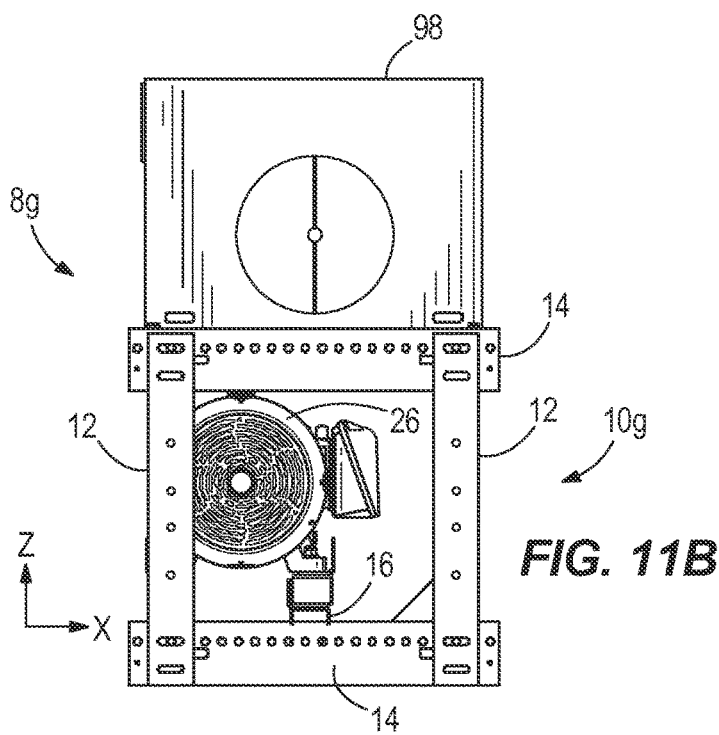
FIG. 11B is a front view of the hydraulic system of FIG. 11A.

FIGS. 8A and 8B employ the same basic structure as the embodiment of FIGS. 7A and 7B, but vary the length of the tank rails 14 and add an additional PMG 26. FIGS. 9A and 9B place the tank 98 between two PMGs 26. FIGS. 10A and 10B show a configuration where the desired length is greater than the maximum length of an available tank rail 14. If the desired overall length is greater than the length of an available tank rail 14, a separate, second, assembly can be provided adjacent the first assembly.

Figure 12A:
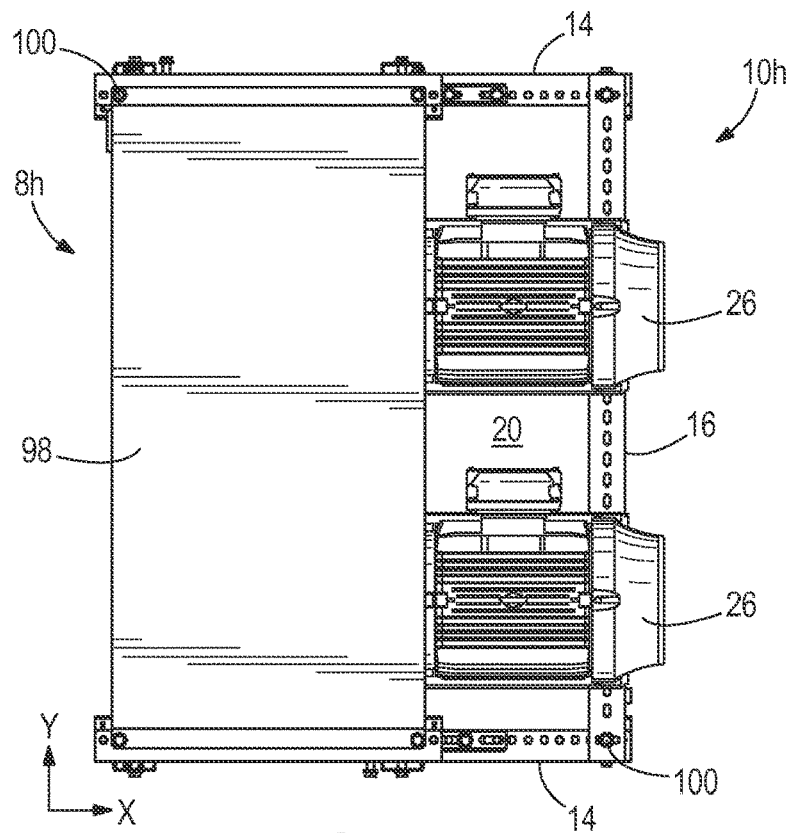
FIG. 12A is a top view of a hydraulic system including a framework assembly in yet another alternative configuration.
Figure 12B:
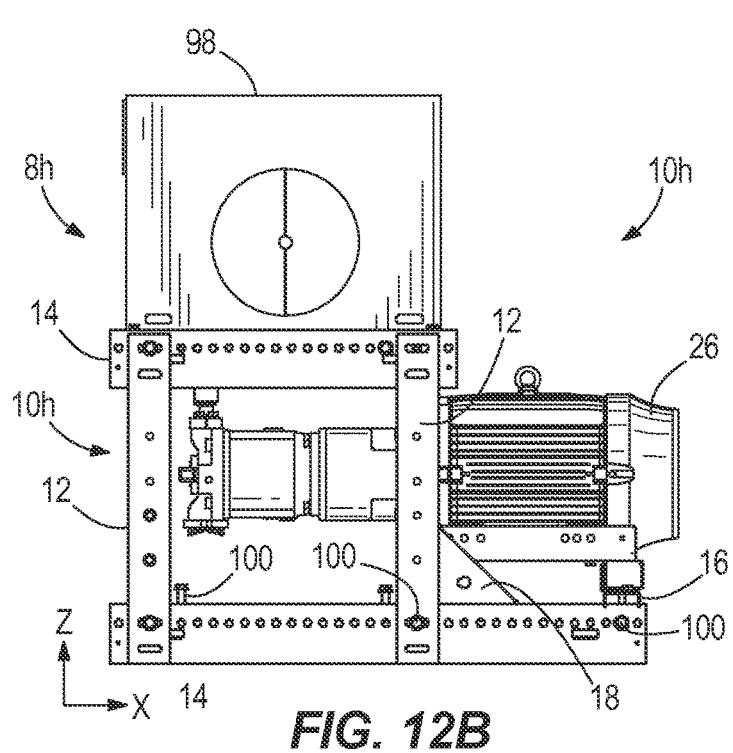
FIG. 12B is a front view of the hydraulic system of FIG. 12A.

Furthermore, in FIGS. 11A, 11B, 12A, and 12B, the framework assembly utilizing the vertical rails 12 creates two levels of tank rails 14 and allows the tank 98 to be placed over a PMG 26 (FIGS. 11A-11B), multiple PMGs 26 (FIGS. 12A-12B), and/or a driptray 20 (FIGS. 12A-12B). The tank rails 14 are bolted to the vertical rails 12 and are additionally secured in place by resting the upper tank rail 14 upon the top-facing support shoulders 33 of the uneven body section 34 and resting the bottom-facing support shoulders 33 of the uneven body section 34 on the lower tank rail 14 (i.e., mating the dimples 36 of the vertical rail 12 with the protuberances 62 on the upper and lower tank rails 14). With the tank 98 located above the PMG 26, flooded suction can be used in place of positive suction. FIG. 12B additionally shows the use of a gusset 18 to provide further support to the increased height of the framework assembly 10h.

What is claimed is:

1. A framework assembly comprising:
   a tank rail containing a plurality of tank mounting apertures over a tank rail length;
   a pump-motor-group (PMG) support rail, arranged generally perpendicular to and mounted to the tank rail, and including a plurality of tank rail mounting apertures along a PMG support rail length, the PMG support rail length extending between a first end of the PMG support rail and a second end of the PMG support rail;
   a fastener for securing the tank rail and the PMG support rail; and an interface between the tank rail and the PMG support rail, the interface comprising:
- a protuberance located on a portion of the tank rail;
- a slit defined by the PMG support rail and extending in a lengthwise direction of the PMG support rail, the slit beginning at the first end and terminating prior to the second end; and
- a dimple sized and shaped to receive the protuberance and positioned at least partially within the slit, wherein the portion of the tank rail that includes the protuberance is positioned within the slit so that the dimple receives the protuberance, and wherein the fastener extends through the PMG support rail and into the portion of the tank rail positioned within the slit.

2. The framework assembly of claim 1, wherein the tank rail is a first tank rail and the PMG support rail is a first PMG support rail, the framework assembly further comprising a second tank rail and a second PMG support rail.

3. The framework assembly of claim 1, further comprising a vertical rail arranged generally perpendicular to the tank rail and the PMG support rail.

4. The framework assembly of claim 3, wherein the vertical rail includes a plurality of vertically-spaced mounting apertures which mate with a plurality of mounting apertures of the tank rail.

5. The framework assembly of claim 4, wherein the mounting apertures of the vertical rail and the mounting apertures of the tank rail are located along a front surface of the vertical rail and a front surface of the tank rail, respectively.

6. The framework assembly of claim 5, wherein the vertical rail includes a support portion and wherein the support portion rests upon a top surface of the tank rail, the top surface being oriented perpendicular to the front surface of the tank rail.

7. The framework assembly of claim 6, wherein the support portion defines a dimple, and wherein the protuberance of the tank rail is sized and shaped to receive the dimple of the vertical rail.

8. The framework assembly of claim 3, further comprising a gusset located at a corner of the tank rail and the vertical rail to provide additional structural support.

9. The framework assembly of claim 8, wherein the gusset contains a right triangular face with a plurality of flanges extending perpendicular to the right triangular face along a horizontal and a vertical edge.

10. The framework assembly of claim 3, further comprising a driptray.

11. The framework assembly of claim 10, wherein the driptray is mounted to the tank rail.

12. The framework assembly of claim 3, wherein the vertical rail is one of at least four identical vertical rails, the tank rail is one of at least four identical tank rails, and the PMG support rail is one of at least two identical PMG support rails.

13. The framework assembly of claim 12, wherein at least two of the at least four tank rails are provided as upper tank rails and are attached near the top of the vertical rails and at least two of the at least four tank rails are provided as lower tank rails and are attached near the bottom of the vertical rails.

14. The framework assembly of claim 13, further comprising a driptray located within one of the upper tank rails or the lower tank rails.

15. The framework assembly of claim 1, wherein the portion of the tank rail is a top surface of the tank rail, and wherein the slit mates with the top surface of the tank rail.

16. The framework assembly of claim 1, wherein the fastener includes at least one bolt.

17. The framework assembly of claim 1, wherein the slit is a first slit, the PMG support rail further comprising a second slit distinct from the first slit and extending in the lengthwise direction of the PMG support rail from the second end and terminating prior to the first end.

18. The framework assembly of claim 1, wherein the slit is a first slit, the PMG support rail further comprising a second slit distinct from the first slit and extending in the lengthwise direction of the PMG support rail from the second end and terminating prior to the first slit.

19. The framework assembly of claim 1, wherein the protuberance extends along the entirety of the tank rail length.

* * * * *